United States Patent
Evans

(10) Patent No.: US 6,746,061 B1
(45) Date of Patent: Jun. 8, 2004

(54) BUMPER BEAM WITH INTERFERENCE-FIT ENERGY ABSORBER

(75) Inventor: Darin Evans, Wixom, MI (US)

(73) Assignee: Shape Corporation, Grand Haven, MI (US)

( * ) Notice: Subject to any disclaimer, the term of this patent is extended or adjusted under 35 U.S.C. 154(b) by 0 days.

(21) Appl. No.: 10/437,113

(22) Filed: May 13, 2003

Related U.S. Application Data

(60) Provisional application No. 60/444,856, filed on Feb. 4, 2003.

(51) Int. Cl.[7] .............................................. B60R 19/18
(52) U.S. Cl. ...................................... 293/120; 293/122
(58) Field of Search ................................ 293/120, 122, 293/121

(56) References Cited

U.S. PATENT DOCUMENTS

| | | |
|---|---|---|
| 3,827,740 A | 8/1974 | Golze et al. |
| 4,165,113 A | 8/1979 | Casse |
| 4,221,413 A | 9/1980 | Bonnetain |
| 4,320,913 A | 3/1982 | Kuroda |
| 4,856,833 A | 8/1989 | Beekman |
| 4,978,562 A | 12/1990 | Wycech |
| 5,219,197 A * | 6/1993 | Rich et al. ................... 293/120 |
| 5,545,361 A | 8/1996 | Rosasco |
| 5,799,991 A | 9/1998 | Glance |
| 6,179,353 B1 * | 1/2001 | Heatherington et al. .... 293/120 |
| 6,217,089 B1 | 4/2001 | Goto et al. |
| 2001/0017473 A1 | 8/2001 | Yamamoto |
| 2002/0060462 A1 * | 5/2002 | Glance ........................ 293/120 |
| 2003/0020290 A1 * | 1/2003 | Cherry ........................ 293/120 |

* cited by examiner

Primary Examiner—Jason Morrow
(74) Attorney, Agent, or Firm—Price Heneveld Cooper DeWitt & Litton

(57) ABSTRACT

A vehicular bumper system includes a tubular beam and an energy absorber press-fit within the tubular beam. In particularly, the energy absorber includes front and rear wall sections, planar stiffening wall sections that extend horizontally continuously and completely between the front and rear wall sections, and stabilizing wall sections that extend between the planar stiffening wall sections. Pairs of stubby protrusions are formed on the rear wall sections that are aligned with the planar stiffening wall sections and that combine with the front and rear wall sections to define an arrangement where, when the energy absorber is forcibly pressed into the cavity of the tubular beam, the protrusions are deformed and stressed and/or are shaved off such that they friction-fit into the tubular beam.

19 Claims, 2 Drawing Sheets

BUMPER BEAM WITH INTERFERENCE-FIT ENERGY ABSORBER

CROSS-REFERENCE TO RELATED APPLICATIONS

The present application claims benefit under 35 USC §1.119(e) of provisional application Serial No. 60/444,856, filed Feb. 4, 2003, entitled BUMPER BEAM WITH INTERFERENCE-FIT ENERGY ABSORBER.

BACKGROUND OF THE PRESENT INVENTION

The present invention relates to automotive bumper systems, and more particularly relates to a tubular bumper beam having an internal energy absorber in the tubular bumper beam.

Tubular bumper beams for vehicles can kink and prematurely collapse when impacted with a "point" source, such as during a front impact with a telephone pole or post. It is desirable to distribute stress to reduce this tendency to kink, as a way of providing a more predictable energy absorption curve and as a way of generally increasing an impact strength of the bumper beam. There are different ways to accomplish this. For example, some tubular beams have a "hat-shaped" sheet metal reinforcement welded longitudinally along a center of their front surface. However, this protrudes in front of the beam, taking up space and making it more complicated to attach a polymeric energy absorber and/or front fascia to the vehicle. Another alternative is to form a foam component within the internal cavity of the tubular beam. However, this process uses expensive materials, takes time for the foam to cure, and may not provide as predictable of a result as is desired.

U.S. Pat. No. 4,856,833 (to inventor Beckman) discloses a bumper beam having an elastically deformable energy-absorbing plastic element (3-11) within a tubular case (1). The specification of Beckman is not clear as to the material of the case (1). The case (1) defines a trapezoidally-shaped cavity, and the plastic element (3-11) fits mateably into the cavity and includes "box-shaped formations 4" connected together by "webs 9" at midpoints (7,8) of the sides of the formations (4) (see FIG. 1, and column 2, lines 11–25). The webs (9) are aligned with a line of impact "F" so that sides of the "box-shaped formations 4" bow and collapse as the tubular case (1) collapses. (See FIG. 2.) It is not clear from Beekman how the plastic element (3-11) is retained within the tubular case (1). It is noted in column 2, lines 27–28, that "A layer of foam 12 can be applied between the impact surface 3 of the energy absorber and case 13." (See column 2, lines 27–29.) This could retain the plastic element in the tubular case. However, it is also noted that the front and rear plates (12 and 11) (i.e. the force "F" strikes a front of the bumper beam when the beam is in a vehicle-mounted position, such that plate 12 is a "front plate") include end sections (i.e. the sections outside of the webs 9) that are several times longer than they are thick. Further, the end sections engage top and bottom angled sides of the case (1). Because the end sections are long and thin, and because they engage angled surfaces, they could not wedgingly hold the plastic element (3-11) within the tubular case (1), since it appears that they would easily and simply bend under if they were stressed. This is consistent with providing an arrangement where the plastic element intentionally collapses the sidewalls of its box-shaped areas. However, it is inconsistent with the present inventive arrangement, wherein one or more walls of the energy absorber extend horizontally completely through the energy absorber from a front wall to a rear wall of a metal tubular beam in a manner preventing premature kinking or bending of a tubular metal beam during impact. It is further inconsistent with the present inventive arrangement, wherein one or more short protruding ridges are shaved off and/or bent over as the energy absorber is press-fit and/or friction-fit into the cavity of a tubular beam, as discussed below.

Accordingly, a bumper system is desired having the aforementioned advantages and solving the aforementioned problems.

SUMMARY OF THE PRESENT INVENTION

In one aspect of the present invention, a bumper system for vehicles includes a tubular beam and an energy absorber. The beam has front, rear, top, and bottom walls defining an internal cavity; with the cavity, when in a vehicle-mounted position, defining an internal horizontal first dimension between the front and rear walls. The energy absorber is longitudinally-extruded and made of a non-foam polymer with wall sections forming a honeycomb-shaped structure. The honeycomb-shaped structure includes front and rear wall sections, planar stiffening wall sections that extend horizontally continuously and completely between the front and rear wall sections, and stabilizing wall sections that extend between the planar stiffening wall sections. The stiffening wall sections include stubby protrusions on at least one of the front and rear wall sections that are aligned with the planar stiffening wall sections and that combine with the front and rear wall sections to define a second dimension that is greater than the first dimension. By this arrangement, when the energy absorber is forcibly pressed into the cavity of the tubular beam, the protrusions and stiffening wall sections are stressed and friction-fit between the front and rear walls of the tubular beam.

In another aspect of the present invention, a method of constructing a bumper system for vehicles comprises steps of providing a tubular beam with front, rear, top, and bottom walls defining an internal cavity. The cavity, when in a vehicle-mounted position, defines an internal horizontal first dimension between the front and rear walls. The method further includes providing a non-foam polymeric energy absorber with wall sections forming a honeycomb-shaped structure. The honeycomb-shaped structure includes front and rear wall sections, planar stiffening wall sections that extend horizontally continuously and completely between the front and rear wall sections, and stabilizing wall sections that extend between the planar stiffening wall sections. The stiffening wall sections include stubby protrusions on at least one of the front and rear wall sections that are aligned with the planar stiffening wall sections and that combine with the front and rear wall sections to define a second dimension that is greater than the first dimension. The method still further includes forcibly pressing the energy absorber into the cavity of the tubular beam, including stressing the protrusions and stiffening wall sections between the front and rear walls of the tubular beam.

In another aspect of the present invention, a method of constructing a bumper system for vehicles comprises steps of providing a tubular beam defining an internal cavity, the tubular beam including front and rear walls, and providing an oversized non-foam polymeric energy absorber having a body and protrusions that in combination with the body to define at least one dimension that is larger than the internal cavity so that the energy absorber cannot be easily slid into the cavity. The method still further includes forcing the energy absorber into the cavity of the tubular beam, the step of forcing including at least one of deforming the protrusions or shaving the protrusions as the energy absorber is moved into the internal cavity.

In addition to supporting the front face of the beam from kinking, an object of the present invention is to have the extruded section provide additional modulus (section moment of inertia) within the geometry (package space) of the tubular beam.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
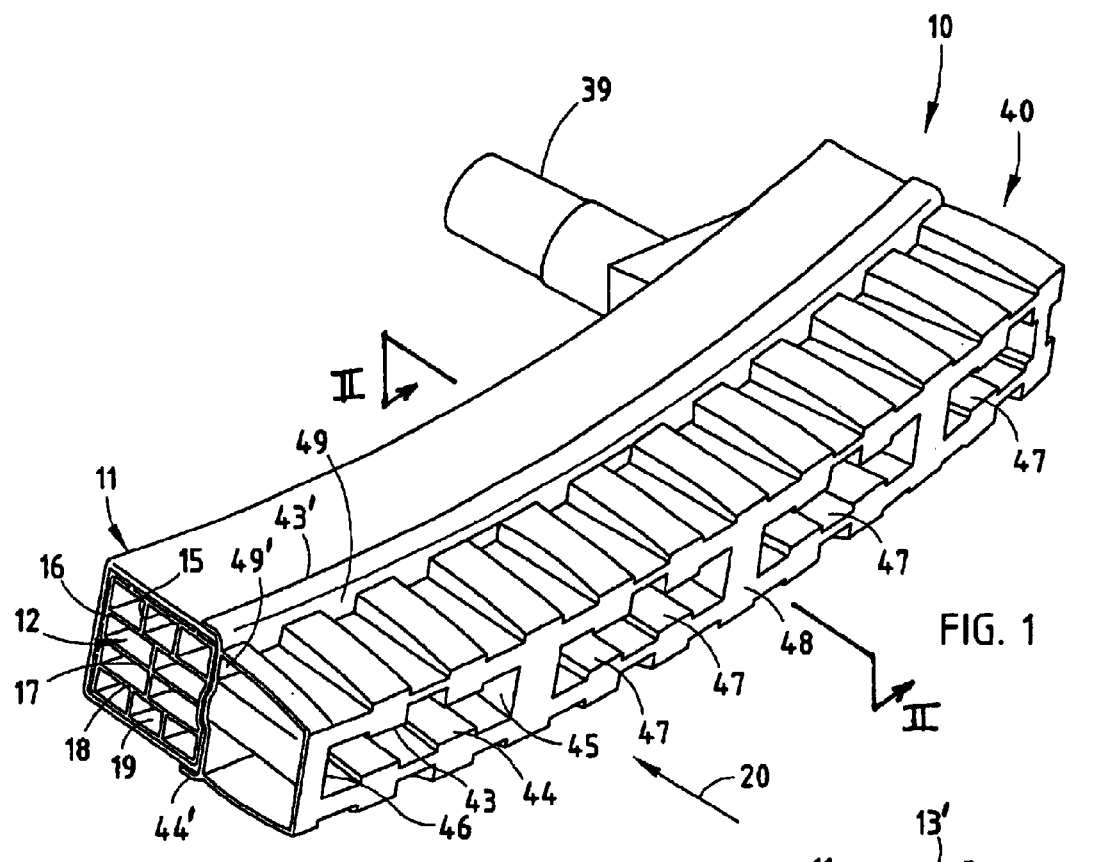
FIG. 1 is a perspective view of a bumper system embodying the present invention.

A vehicular bumper system 10 (FIG. 1) includes a tubular beam 11 and an energy absorber 12 press-fit within the tubular beam 11. In particular, the energy absorber 12 includes stubby protrusions 13 (FIG. 2) on its rear wall section 26 and stubby protrusions 14 on its top wall section 15 that are deformed and/or shaved off when the energy absorber 12 is forced into the tubular beam 11. Further, the energy absorber 12 includes horizontally-extending stiffening wall sections 15–19 that extend continuously from front to rear of the energy absorber 12, such that stress from a front impact (see arrow 20) is transmitted through the bumper system 10 in a manner reducing a likelihood of premature failure due to kinking of the bumper system 10.

The tubular beam 11 includes front, rear, top, and bottom walls 21–24, respectively, which are connected by radiused corners 25'. The energy absorber 12 includes front and rear wall sections 25–26 that combine with the top and bottom wall sections 15 and 19 to form a tubular shape similar to the walls 21–24 of the beam 11, but that form a cross section capable of fitting into the cavity of the beam 11. The stiffening wall sections 15–19 extend horizontally continuously and completely between the front and rear wall sections 25–26. Stabilizing wall sections 27–32 extend vertically between various ones of the wall sections 15–19. As illustrated, at least some of the stabilizing wall sections 27–32 are vertically misaligned so that when the beam 11 does start to permanently deform, bend and collapse, the collapse of the wall sections 15–19 is more predictable and uniform.

The two stubby protrusions 13 on the rear wall section 26 are aligned with the horizontal stiffening wall sections 16 and 18. By this arrangement, any impacting force 20 is communicated from front wall 21 of the beam 11 through the wall sections 15–19 to the rear wall 24 of the beam 11. Due to the press-fit condition of the energy absorber 12 within the beam 11, the impacting forces are immediately communicated, and there is no initiation of a kink or sharp bend at a point of high stress before the energy absorber 12 begins serving its intended purpose of distributing impact stress. Notably, a pair of the protrusions 14 are formed in the top wall 15 and extend upwardly. The protrusions 14 are similar to the protrusions 13 in shape and size, but they are located in a misaligned position with the stabilizing wall sections 27–28.

It is contemplated that the stubby protrusions 13 will optimally be about twice their height or slightly shorter (as molded), although longer or shorter arrangements are contemplated to be within the present inventive concepts. The protrusions 13 extend a length of the energy absorber 12, as do the wall sections 15–19 and 25–32, permitting the energy absorber 12 to be manufactured by extrusion molding processes.

Mounts 39 (FIG. 1) are welded to the rear wall 22 to support the bumper system 10 on a vehicle. A fascia (not specifically shown) covers the bumper assembly.

Figure 3:
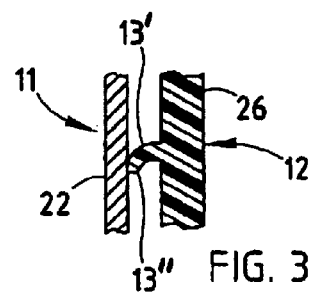
FIG. 3 is a fragmentary sectional view showing a protrusion similar to the protrusion shown in FIG. 2 but modified to include a bent-over portion.
Figure 2:
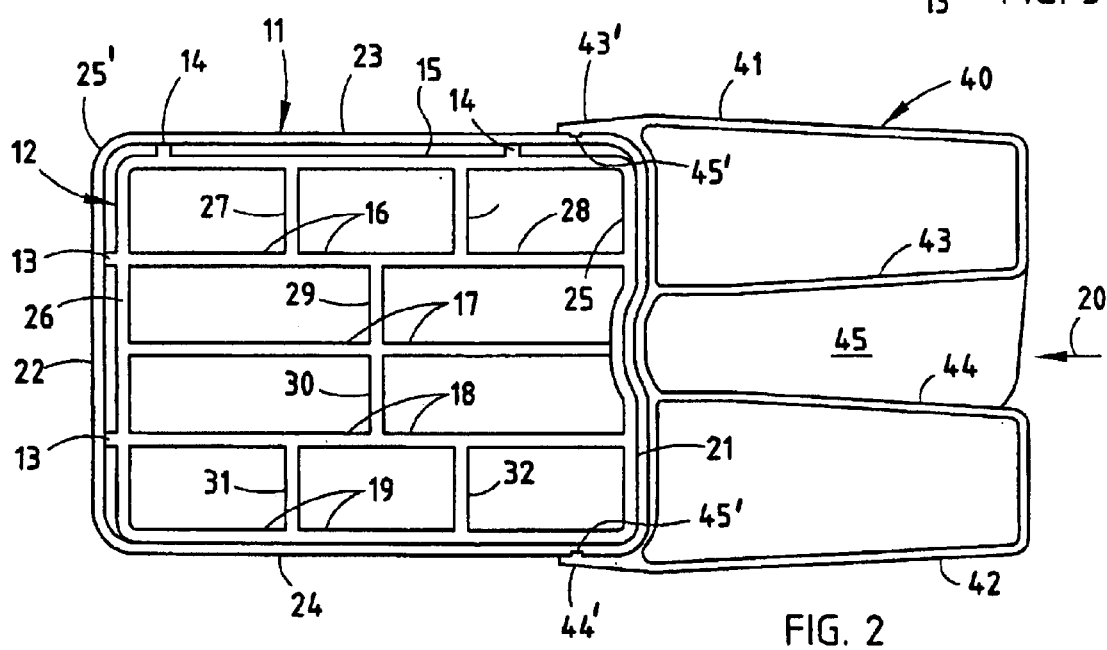
FIG. 2 is a cross section taken along the line II—II in FIG. 1.

During installation, the energy absorber 12 is forced longitudinally into the cavity of beam 11. During the forced insertion, the protrusions 13 (and 14) are shaved off, leaving a stub that has a height equal to its thickness (FIG. 2). Alternatively, it is contemplated that the protrusion (see protrusion 13' in FIG. 3) can be designed to be deformed and bent over during the installation process, such that a tip 13" of the protrusion 13' resiliently deflects and engages the walls of the tubular beam 11. In either event, the protrusions 13 (and 13') are designed to be compressed and stressed during the installation, such that the protrusions both frictionally press-fittingly hold the energy absorber 12 in the tubular beam 11, and also they are tensioned against the front and rear walls 21–22 to distribute stress in a manner much better than a loose-fitting internal energy absorber.

A method of constructing a bumper system for vehicles comprises steps of providing a tubular beam with front, rear, top and bottom walls defining an internal cavity. The cavity, when in a vehicle-mounted position, defines an internal horizontal first dimension between the front and rear walls. The method further includes providing a non-foam polymeric energy absorber with wall sections forming a honeycomb-shaped structure. The honeycomb-shaped structure includes front and rear wall sections, planar stiffening wall sections that extend horizontally continuously and completely between the front and rear wall sections, and stabilizing wall sections that extend in misaligned positioned between the planar stiffening wall sections. The stiffening wall sections include pairs of stubby protrusions on at least one of the front and rear wall sections that are aligned with the planar stiffening wall sections and that combine with the front and rear wall sections to define a second dimension that is greater than the first dimension. The method still further includes forcibly pressing the energy absorber into the cavity of the tubular beam, including stressing the protrusions and stiffening wall sections between the front and rear walls of the tubular beam. The step of forcibly pressing includes deforming the protrusions and/or shaving the protrusions to create a tight press-fit condition of the energy absorber within the tubular beam.

In its broader aspects, the method comprises steps of providing a tubular beam defining an internal cavity, with the tubular beam including front and rear walls, and also providing an oversized non-foam polymeric energy absorber. The energy absorber has a body and protrusions that, in combination with the body, define at least one dimension that is larger than the internal cavity so that the energy absorber cannot be easily slid into the cavity. The method still further includes forcing the energy absorber into the cavity of the tubular beam, the step of forcing including at least one of deforming the protrusions or shaving the protrusions as the energy absorber is moved into the internal cavity.

In the illustrated bumper system 10, an injection-molded second energy absorber 40 (FIGS. 1 and 2) is attached to a front face of the bumper beam 11. The energy absorber 40 includes a continuous top wall 41 and bottom wall 42, with rearwardly-extending flanges 43' and 44' having protrusions or hooks 45' thereon for engaging mating apertures in the top and bottom walls 23 and 24 of the beam 11 to temporarily hold the energy absorber 40 on the beam 11. Internal walls 43–46 form box-like sections at apertures 47 in the front wall 48. The rear wall 49 includes wall sections 49' having the shape of apertures 47 and further includes apertures shaped like the front wall 48, such that the energy absorber 40 can be made by injection-molding dies without the use of pulls and slides and without the need for other movable die components for making blind surfaces.

Figure 4:
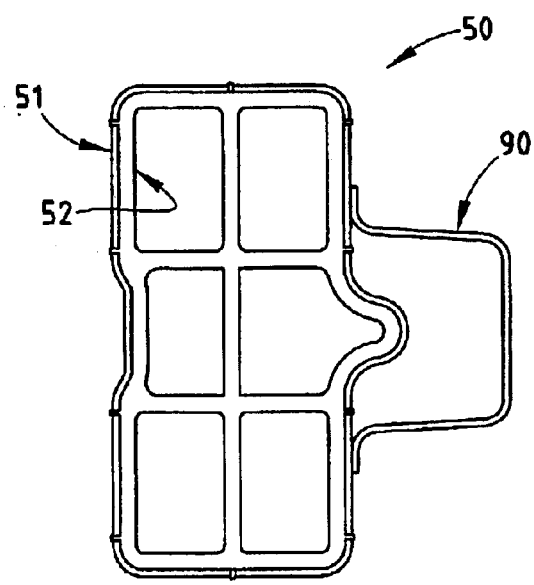
FIG. 4 is a cross-sectional view of a modified bumper system embodying the present invention.
Figure 5:
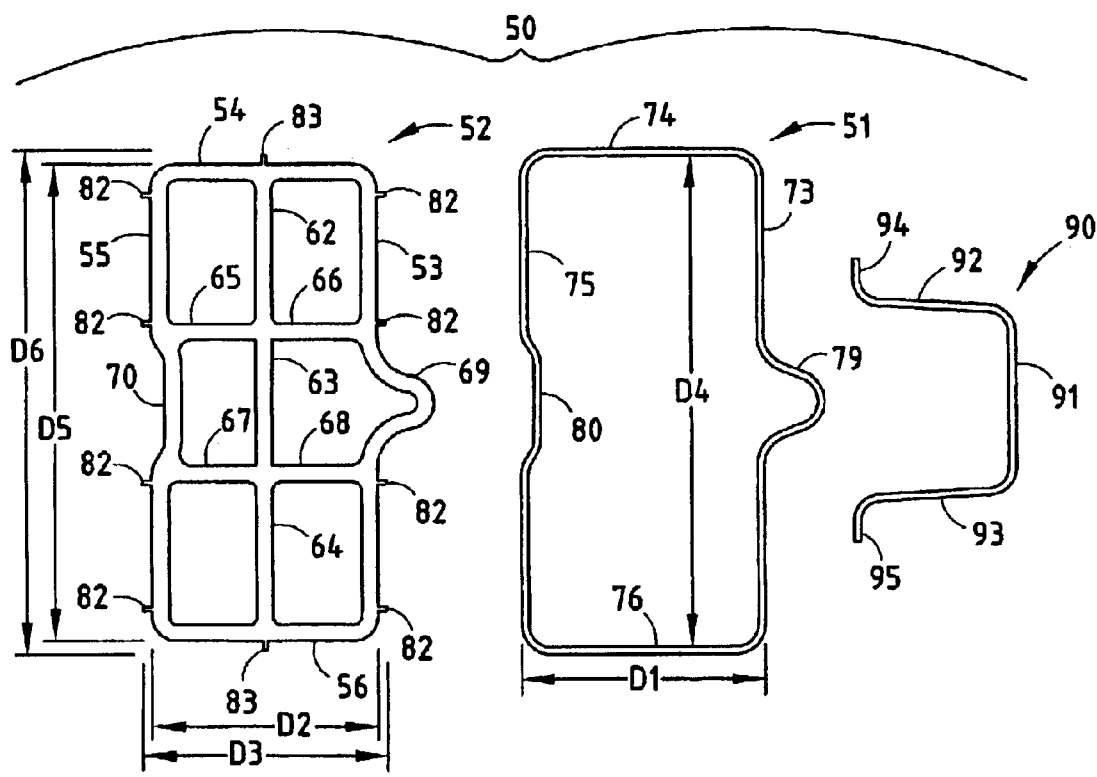
FIG. 5 is an exploded cross-sectional view of FIG. 4.

The bumper system 50 (FIGS. 4–5) is a modification of the bumper system 10 described above. In bumper system 50, a steel tubular beam 51 defines a cavity, which closely mateably receives an extruded plastic internal energy absorber 52. The internal energy absorber 52 closely fits within the beam 51, thus helping prevent the beam 51 from prematurely failing from kinking and bending upon receiving a "post" type center impact. It is contemplated that an impact strength of the bumper system 50 (i.e. including the beam 51 and internal energy absorber 52) will increase at least by about 10% or more over an impact strength of the beam 51 alone (i.e. without the internal energy absorber 52), for reasons described below.

The energy absorber 52 includes a perimeter formed by a front vertical wall 53, a top horizontal wall 54, a rear vertical wall 55 and a bottom horizontal wall 56. Front, top, rear, and bottom protrusions 82 and 83 extend from the walls 53–56, respectively. A vertical center wall is formed by wall sections 62–64. A top intermediate horizontal wall is formed by aligned wall sections 65–66, and a bottom intermediate horizontal wall is formed by aligned wall sections 67–68. The illustrated front wall 53 includes a forward U-shaped bend 69, and the rear wall 55 includes a shallower U-shaped inward bend 70. It is contemplated that the bends 69 and 70 are not required to practice the present inventive bumper system, but are shown to illustrate that the present inventive concepts are not limited to only rectangular beam structures. As illustrated, the walls 53–56 and wall sections 62–68 have thicknesses that are about equal, but it is noted that particular walls can be made thicker or thinner to optimize a strength of the bumper system 50. Also, different materials can be used to make the energy absorber 52.

The tubular beam 51 is rollformed from steel sheet material into a tubular shape, whereupon its edges are welded together to form a permanent tubular shape. The tubular shape can be swept into a longitudinal curvature to match an aerodynamic shape of a front of a vehicle, if desired. The tubular beam 51 includes a front vertical wall 73, a top horizontal wall 74, a rear vertical wall 75, and a bottom horizontal wall 76. A forward U-shaped bend 79 is formed in the front wall 73, and a shallower forward U-shaped bend 80 is formed in the rear wall 75. The bends 79 and 80 are eliminated if the bends 69 and 70 are eliminated.

The several protrusions 82 are formed on the exterior surface of the front and rear surfaces of the front and rear walls 53 and 55 at locations generally aligned with the wall sections 65–66 and 67–68. Also, several protrusions 82 are formed on the exterior surface of the front and rear surfaces of the front and rear walls 53 and 55 at locations generally horizontally aligned with the top and bottom walls 54 and 56, though these protrusions 82 are positioned vertically inboard slightly to avoid the radiused corners that connect the walls 53–56. Protrusions 83 extend upwardly and downwardly from the outer surfaces of the top and bottom walls 54 and 56 at locations aligned with the vertical internal wall sections 62–64. The illustrated protrusions 82 and 83 have a thickness that is about 20% to 30% of the thickness of the walls 52–55 and wall sections The interior surfaces of the front and rear walls 73 and 75 of the steel beam 51 define a dimension D1. The outer surfaces of the front and rear walls 53 and 55 of the plastic energy absorber 52 define a dimension D2 that is less than the dimension D1 but close thereto. The outer ends of the front and rear protrusions 82 define a dimension D3 that is greater than D1. Thus, when the energy absorber 52 is press-fit into the cavity of steel beam 51, the protrusions 82 create a press-fit condition (see FIG. 3) and/or the protrusions 82 are shaved off slightly (see FIG. 4). Similarly, the interior surfaces of the top and bottom walls 74 and 76 of the steel beam 51 define a dimension D4. The outer surfaces of the top and bottom walls 54 and 56 of the plastic energy absorber 52 define a dimension D5 that is less than the dimension D4 but close thereto. The outer ends of the top and bottom protrusions 83 define a dimension D6 that is greater than D4. Thus, when the energy absorber 52 is press-fit into the cavity of steel beam 51, the protrusions 83 create a press-fit condition and/or the protrusions 83 are shaved off slightly. Notably, the bends 69, 70 fit mateably into the bends 79,80, such that the energy absorber 52 fits mateably into the beam 51.

It is noted that the addition of the energy absorber 52 into the beam 51 increases a moment of inertia of the beam-and-absorber combination, such as about 10% depending upon the materials chosen for the beam 51 and the energy absorber 52, and depending upon the material and wall thicknesses. However, even further, the presence of the internal energy absorber adds considerably to an effective impact strength of the bumper system 50 since the energy absorber 52 supports the walls of the beam 51 to prevent kinking and premature catastrophic collapse during a front impact, such as against a pole. For example, passenger vehicles are required to pass certain bumper tests mandated under the Federal Motor Vehicle Safety Standards (FMVSS). Existence of the present internal energy absorber 52 within the beam 51 can reduce horizontal deflection at a center point of the bumper system 50 when impacted against a point impact source, such as a pole, by as much as 10% or greater. Notably, a significant part of the energy absorption and the support against kinking and premature collapse in the beam 51 comes from the alignment of the horizontal wall sections 65–66 and 67–68, and the fact that ends of these walls lie close to the front and rear walls 73 and 75 of the beam 51, such that the energy absorber 52 is able to stop the initial material instability that leads to kinking and premature collapse in the walls of the beam 51.

Where further strength is desired, a U-shaped pole protector in the form of a channel 90 can be attached to the front wall 73 of the beam 51. The channel 90 includes a front wall 91, top and bottom horizontal walls 92 and 93, and up and down attachment flanges 94 and 95 for attachment to the face of the front wall 73. The channel 90 does not extend a full length of the beam 51, but instead only extends as far as necessary to distribute stress from a pole impact across a length of the beam 51 and to the vehicle's frame rails. It is noted that the energy absorber 52, since it is entirely within the beam 51, does not interfere with attachment of the pole protector channel 90.

The present arrangement of an interference-fit or snugly-fit internal energy absorber 52 inside of beam 51 both reduces a tendency of the beam 51 to prematurely kink, and also provides an increased moment of inertia of the beam 51. The increase in moment of inertia with the press-fit internal energy absorber is less than the increase in moment of inertia from a pole protector, but still is significant, especially when the benefits for styling are considered. For example, in the illustrated arrangement, the individual moment of inertia (I) and modulus of elasticity (E) of each separate component is as follows:

Beam $51=I_{bm}=0.305\times10^6 (m^4)$ $E_{stl}=2.10\times10^5 (MPa)$

Extrusion $52=I_{est}=0.86\times10^6 (m^4)$ $E_{ext}=6.700\times10^3 (MPa)$

Beam 51 and pole protector $90=I_{bm+pp}=0.603\times10^6 (m^4)$ $E_{bm+pp}=2.10\times10^5 (MPa)$ P=impact load=60 KN L=distance between inside edge of supports (i.e. rail span)=1.2 m $W=(P\times L)/(48\times E\times I)$=distance of deflection upon loading $W_{bm}$=33.7 mm=deflection of beam alone $W_{bm+ext}$=30.9 mm=deflection of beam with internal energy absorber $W_{bm+pp}$=17.1 mm=deflection of beam with pole protector The extruded plug (energy absorber 52) provides two functions: 1) Prevent the section of beam 51 from collapsing (i.e. a function like the foam core in a surfboard); and 2) provides additional section stiffness (EI) for reduced intrusion (W).

The pole protector 90, described below, provides the same two functions as plug 52, but to a different degree: 1) Additional section stiffness contributed by the pole protector 90 is much greater than via contribution of extruded plug 52. However, the section stiffness will reduce as the pole protector 90 is crushed (extruded plug 52 will provide continuous added stiffness). 2) The pole protector 90 spreads the impact load across the face of beam 51 and will thus reduce tendency for beam 51 face to collapse. However, for light-weight beams (thin gauge, open "D" section, especially beams with high height-to-depth ratio, there will still be a greater tendency to lose the beam section (rapid decrease in stiffness) than when an extruded plug is incorporated/positioned inside the beam 51. 3) The pole protector 90 requires more package space and limits styling of the beam 51. 4) The pole protector 90 limits the amount of energy absorber crush and can lead to unacceptably higher rail loads.

Much like channel 90, it is contemplated that the energy absorber 52 does not necessarily extend a complete length of the beam 51, but instead only need extend as far as strategically necessary. Additional wall sections 62–68 can be added as desired to provide increased internal strength to the energy absorber 52, and also as desired to provide clearance for items attached to the beam 51, such as lamps, bumper guards, hitches, and the like.

It is to be understood that variations and modifications can be made on the aforementioned structure without departing from the concepts of the present invention, and further it is to be understood that such concepts are intended to be covered by the following claims unless these claims by their language expressly state otherwise.

I claim:

1. A bumper system for vehicles comprising:
   a tubular beam with front, rear, top and bottom walls defining an internal cavity; the cavity, when in a vehicle-mounted position, defining an internal horizontal first dimension between the front and rear walls; and
   a longitudinally-extruded non-foam polymeric energy absorber with wall sections forming a honeycomb-shaped structure, the honeycomb-shaped structure including front and rear wall sections, planar stiffening wall sections that extend horizontally continuously and completely between the front and rear wall sections, and stabilizing wall sections that extend between the planar stiffening wall sections, the stiffening wall sections including stubby protrusions on at least one of the front and rear wall sections that are aligned with the planar stiffening wall sections and that combine with the front and rear wall sections to define a second dimension that is greater than the first dimension, so that when the energy absorber is forcibly pressed into the cavity of the tubular beam, the protrusions and stiffening wall sections are stressed and friction-fit between the front and rear walls of the tubular beam.

2. The bumper system defined in claim 1, wherein the stubby protrusions are shaved during a press-fit install into the tubular beam.

3. The bumper system defined in claim 1, wherein the stubby protrusions deform laterally during the press-fit install.

4. The bumper system defined in claim 3, wherein the stubby protrusions are ridges that extend longitudinally along the energy absorber.

5. The bumper system defined in claim 4, wherein the energy absorber includes top and bottom wall sections, and at least one of the top and bottom wall sections includes second stubby protrusions that engage one of the top and bottom walls to frictionally retain the energy absorber within the tubular beam.

6. The bumper system defined in claim 1, wherein the stubby protrusions include at least two elongated ridge-shaped protrusions.

7. The bumper system defined in claim 6, wherein the energy absorber comprises an elongated extrusion having a honeycomb-shaped transverse cross section.

8. A method of constructing a bumper system for vehicles comprising steps of:
   providing a tubular beam with front, rear, top, and bottom walls defining an internal cavity; the cavity, when in a vehicle-mounted position, defining an internal horizontal first dimension between the front and rear walls;
   providing a non-foam polymeric energy absorber with wall sections forming a honeycomb-shaped structure, the honeycomb-shaped structure including front and rear wall sections, planar stiffening wall sections that extend horizontally continuously and completely between the front and rear wall sections, stabilizing wall sections that extend between the planar stiffening wall sections, the stiffening wall sections including stubby protrusions on at least one of the front and rear wall sections that are aligned with the planar stiffening wall sections and that combine with the front and rear wall sections to define a second dimension that is greater than the first dimension; and
   forcibly pressing the energy absorber into the cavity of the tubular beam, including stressing the protrusions and stiffening wall sections between the front and rear walls of the tubular beam.

9. The method defined in claim 8, wherein the step of forcibly pressing includes shaving off at least a portion of the protrusions.

10. The method defined in claim 8, wherein the step of forcibly pressing includes deforming the protrusions laterally to fit within the cavity.

11. The method defined in claim 10, wherein the protrusions are elongated in a longitudinal direction such that they form a ridge along the energy absorber.

12. The method defined in claim 11, wherein the energy absorber further includes a pair of top protrusions, and wherein the step of forcibly pressing includes engaging the top protrusions with the tubular beam.

13. The method defined in claim 8, wherein the stubby protrusions include at least two elongated and spaced-apart protrusions.

14. The method defined in claim 8, wherein the stubby protrusions comprise ridges integrally formed of contiguous material of the energy absorber.

15. A method of constructing a bumper system for vehicles comprising steps of:

providing a tubular beam defining an elongated internal cavity, the tubular beam including front and rear walls;

providing an oversized longitudinally-extruded non-foam polymeric energy absorber having a body and longitudinally-elongated protrusions that in combination with the body define at least one dimension that is larger than the internal cavity so that the energy absorber cannot be easily slid into the cavity; and forcing the energy absorber into the cavity of the tubular beam, the step of forcing including at least one of deforming the protrusions or shaving the protrusions as the energy absorber is forcibly moved into the internal cavity.

16. The method defined in claim 15, wherein the step of forcing includes deforming the protrusions.

17. The method defined in claim 16, wherein the step of forcing includes permanently deforming the protrusions.

18. The method defined in claim 16, wherein the step of forcing includes elastically deforming the protrusions.

19. The method defined in claim 15, wherein the step of forcing includes shaving off a portion of the protrusions.

* * * * *